United States Patent [19]

Moccia

[11] 3,713,804
[45] Jan. 30, 1973

[54] PROCESS FOR REGULATING PLANT GROWTH
[75] Inventor: David E. Moccia, Cincinnati, Ohio
[73] Assignee: The Procter & Gamble Company, Cincinnati, Ohio
[22] Filed: May 1, 1970
[21] Appl. No.: 33,895

[52] U.S. Cl. ................71/78, 71/80, 71/106, 71/122, 71/DIG. 1
[51] Int. Cl. ..................................A01n 9/24
[58] Field of Search................71/78, 122, 80, DIG. 1

[56] References Cited

UNITED STATES PATENTS 3,235,367  2/1966  Gathman..................................71/78

FOREIGN PATENTS OR APPLICATIONS 1,094,524  12/1960  Germany..................................71/80

OTHER PUBLICATIONS

Dykyj et al., "Phys. props. of ethylene glycol & its ders." (1958) Chem. Zvest. 12, pp. 543–557 (1958).
Steffens et al., "Selection of F.A. ders." (1969) J. Ag. Food Chem. 17, pp. 312–317 (1969).
Vilenskii et al., "Syneresis of a dynamic froth" (1966) CA 65, p. 4683 (1966).
Klinkoski, "Possibilities of inactivation of TMV by chem. agents" (1961) CA 56, p. 9166 (1962).

Primary Examiner—Lewis Gotts
Assistant Examiner—G. Hollrah
Attorney—Richard C. Witte and Robert B. Aylor

[57] ABSTRACT

Compositions comprising diethyleneglycol monobutyl ether, an ethyleneglycol hydrocarbyl ether or its ester, and a surfactant selected from the group consisting of anionic surfactants, cationic surfactants, and nonionic primary, secondary and tertiary amines in a weight ratio relationship of, respectively, about 2:1:1; the compositions are particularly useful, in diluted form, for systemically (as well as by contact) retarding or inhibiting the growth of meristematic plant tissue, particularly tobacco suckers.

10 Claims, No Drawings

PROCESS FOR REGULATING PLANT GROWTH

BACKGROUND OF THE INVENTION

The invention herein generally relates to compositions which can effectively regulate the growth rate of apical meristematic tissue of plants and to methods of applying and utilizing those compositions. More particularly, the invention herein pertains to compositions and methods which can be used to systemically and by contact inhibit or retard the growth of undesirable axillary shoots (suckers) in tobacco plants without affecting the (mature) tobacco leaves.

Tobacco producers have long realized that removal of the tobacco blossoms from the maturing plants aids in developing the size and quality of tobacco leaves. The blossoms are usually removed by hand at a time approximately midway between the first appearance of the tobacco blossoms and the last vestiges of those blossoms. While the blossoms are intact, they substantially inhibit the formation and growth of tobacco suckers, or axillary buds, but immediately on the removal of the blossoms, suckers begin to sprout. The suckers first form in the upper portions of the plant and appear as long leaf-like growths. If these suckers are allowed to mature, they will form blossoms and rob the maturing tobacco leaves of nutrients, reduce yield, and lower the tobacco quality.

The desirability of removing or inhibiting the growth of these suckers by chemical means, rather than by hand, has been well demonstrated in the prior art, which, accordingly, has provided a wide variety of growth-regulating or growth-inhibiting compositions. Generally, such growth-regulating compositions can be categorized into two basic groups: (1) contact compositions and (2) systemic compositions. As the term implies, contact compositions are effective only on those areas of the plant to which they are directly applied or contacted; thus, for example, if such a composition is applied only to the bottom portion of a tobacco plant, suckers growing on the upper portion (the region in which the suckers generally first form) of the plant are generally not affected. Examples of contact growthregulating compositions include compositions comprising an emulsifying agent or surfactant in combination with a fatty alcohol and/or a fatty acid ester; see, for example, U.S. Pat. No. 3,340,040, U.S. Pat. No. 3,223,517, U.S. Pat. No. 3,438,765 and U.S. Pat. No. 3,326,664.

Systemic plant-regulating compositions, as the term implies, are compositions which regulate or inhibit plant growth throughout the plant regardless of the portion of the plant to which the composition is applied; thus, when such a composition is applied only to the bottom portion of a plant, the growth of tobacco suckers at the top of the plant can still be inhibited or retarded. Examples of systemic growth-regulating compositions include the widely used maleic hydrazide, and the alkanolamide, alkali metal, or other water-soluble salts of maleic hydrazide, e.g., succinic acid-2,2-dimethyl hydrazide. These and other systemic growth-regulating compositions are disclosed in U.S. Pats. Nos. 3,334,991; 3,240,799; 3,156,554; 3,268,323; 2,695,225; 2,614,916; 2,614,917; and 2,575,954.

Certain contact compositions which control the growth of tobacco suckers, for example, compositions comprising fatty acids, can cause burning of the tobacco leaves. Burning is characterized by slight chlorosis, or yellowing, of the leaves when the burn is relatively minor. In the more serious cases of burning, this condition is characterized by deep brown splotches and withering off the tobacco leaves. Any amount of burn or yellowing, of course, reduces the value of the leaves; but in advanced stages of burning, the leaves are wholly unacceptable.

Moreover, certain of the systemic tobacco sucker control compositions, e.g., the maleic hydrazide compositions, generally result in tobacco leaves of inferior quality. For example, leaf experts show a statistically significant preference for hand-suckered tobacco; smokers prefer the taste of hand-suckered tobacco; and, the maleic hydrazide (or its salts) treatments lower the specific volume of the tobacco leaf and increase the reducing sugar content and equilibrium moisture content.

A systemic growth-regulating composition is desirable, inasmuch as a major advantage of such a composition, in comparison to a similar contact composition, is the relative ease with which the composition can be applied to the plant; moreover, smaller amounts of systemic compositions are required to achieve a result comparable to a result achieved with a larger amount of a contact composition.

It is, therefore, desirable to provide a systemic growth-regulating composition which can effectively be employed to retard or inhibit the growth of tobacco suckers without physically or chemically harming the tobacco leaves to the detriment of their intended use.

Accordingly, it is an object of the invention herein to provide a plant growth-regulating composition.

It is another object of the invention herein to provide a combination contact and systemic plant growth-regulating composition which can effectively be used to retard or inhibit the growth of tobacco suckers.

Another object of the invention herein is to provide a process for retarding or inhibiting the growth of tobacco suckers with a combination contact and systemic plant growth-regulating compositions.

BRIEF SUMMARY OF THE INVENTION

These and other objects are achieved by the invention herein which comprises a plant growth-regulating composition comprising: (A) diethyleneglycol monobutyl ether; (B) a compound selected from the group consisting of ethyleneglycol hydrocarbyl ethers and ester derivatives of ethyleneglycol hydrocarbyl ethers (as defined more specifically hereinafter); and (C) a surfactant selected from the group consisting of anionic surfactants, cationic surfactants, and nonionic surfactants selected from the group consisting of primary, secondary, and tertiary alkyl amines having a total of from about eight to about 22 carbon atoms, wherein each alkyl contains from about one to about 22 carbon atoms; wherein the weight ratio of (A) to (B) to (C) is, respectively, about 2:1:1.

Briefly, it has now been surprisingly discovered that compositions comprising specific amounts of diethyleneglycol monobutyl ether, an ethyleneglycol hydrocarbyl ether (or ester derivative thereof), and certain surfactants, can readily be formulated into concentrate compositions which, upon subsequent dilution with water, can be particularly useful in the effective regulation of the growth of tobacco suckers.

The invention herein additionally comprises a process for regulating plant growth, particularly the growth of tobacco suckers, comprising applying to the plant an effective amount of an above-described growth-regulating composition, in dilute form, consisting essentially of: (A) diethyleneglycol monobutylether; (B) ethyleneglycol hydrocarbylether (or ester derivative thereof); (C) a surfactant selected from the group consisting of anionic surfactants, cationic surfactants, and nonionic surfactants selected from the group consisting of primary, secondary, and tertiary alkyl amines having a total of from about eight to about 22 carbon atoms, wherein each alkyl can have from about one to about 22 carbon atoms; and, (D) water; wherein the weight ratio of components (A) to (B) to (C) is respectively about 2:1:1, and wherein the volumetric ratio of the sum of components (A), (B), and (C) to component (D) ranges from about 1:4.5 to about 1:12, preferably about 1:9. The dilute compositions can be applied to the plants by any suitable or convenient manner, e.g., spraying, painting (applying, e.g., with a brush), or the like. The process can be used to treat both topped or untopped plants; the term "topped", as used herein and as generally known in the art, means tobacco plants which have had their primary blossoms removed.

Advantageously, the dilute compositions of the invention herein exhibit both contact and systemic activity and generally do not chemically or physically affect the tobacco leaves to the detriment of their intended use. Additionally, it has been found that the compositions of the invention herein do not generally induce 'false ripening' as extensively as other systemic compositions, e.g., maleic hydrazide or maleic hydrazide salts. False ripening is a term well known in the art and, generally, refers to a condition of the tobacco leaf, induced by certain chemical treatments of the tobacco plant, in which the leaves exhibit a yellowed or bronzed coloration, indicative of ripened leaves; this induced condition of false ripening can lead to plant loss due to removal of the seemingly ripened leaves. Compositions of the invention herein, induce false ripening, firstly, to a substantially lesser degree than do other systemic compositions and, secondly, for only a temporary period of time.

DETAILED DESCRIPTION OF THE INVENTION

The invention herein contemplates the provision of specific compositions found to be effective in the control of plant growth. Specifically, the compositions are effective on contact and systemically and exhibit the capability of selectively retarding or inhibiting the growth of, broadly, meristematic plant tissue (i.e., the apical or growing tip of the plant, which portion is generally the fastest growing part) and particularly, the axillary shoots or suckers of tobacco plants.

Additionally, the compositions of the invention herein have been found useful in retarding or inhibiting the growth of meristematic tissue of woody ornamentals, e.g., azaleas. In the case of such woody ornamental plants, the compositions can conveniently be employed to promote branching of the plant, thereby achieving a fullness of the plant not normally obtainable in natural growth.

The invention herein contemplates, as one embodiment, providing such growth-regulating compositions in the form of an aqueous (water) composition which is achieved by diluting a concentrate comprising (A) about 2 parts by weight diethyleneglycol monobutyl ether, (B) about one part by weight of an ethyleneglycol hydrocarbyl ether (or ester derivative), and (C) about one part by weight of a surfactant selected from the group consisting of anionic surfactants, cationic surfactants and nonionic surfactants selected from the group consisting of primary, secondary and tertiary alkyl amines wherein each alkyl can contain from about one to about 22 carbon atoms and the amine contains a total of from about eight to about 22 carbon atoms, with a sufficient amount of water to provide a volumetric ratio of the sum of components (A), (B), and (C) to the water within the range of from about 1:4.5 to about 1:12, preferably about 1:9.

The above-described aqueous compositions of the invention herein are both contact and systemically active and can be readily applied to tobacco plants by methods hereinafter described to effectively retard or inhibit the growth of tobacco suckers without harming the tobacco leaves, either physically or chemically, to the detriment of their intended use.

Dependent upon the specific surfactant and ethyleneglycol hydrocarbyl ether (or ester derivative thereof) employed, the aqueous compositions herein can be an aqueous emulsion or an aqueous solution. Preferred aqueous compositions are those which are solutions, inasmuch as the aqueous solutions are single-phase and generally do not pose stability or phase-separation problems and may be more acceptable to the consumer.

In order to achieve satisfactory growth-regulating activity, it is essential that the compositions comprise as ingredients, described more fully hereinafter, the combination of diethyleneglycol monobutyl ether (hereinafter also referred to herein as "DEGMBE" for brevity), and ethyleneglycol hydrocarbyl ether or its ester derivative (hereinafter also referred to as "EGHE" for brevity), and a specifically selected surfactant. Any one of the essential components herein individually or any two of the components in combination do not generally provide compositions which exhibit the enhanced growth-regulating activity generally achieved by the compositions of the inventions herein.

Contrary to expectations, it has been surprisingly found that substitution of DEGMBE with other diethyleneglycol monoalkyl ethers generally results in compositions which do not achieve the enhanced levels of growth-regulating activity achieved by the compositions herein. For example, when the monobutyl radical in DEGMBE was substituted with, among others, monomethyl, monoethyl, and diethyl radicals, the resulting compositions exhibited substantially reduced efficacy in their effectiveness as regulators of meristematic tissue growth, particularly as tobacco sucker control compositions, relative to the compositions of the instant invention.

Accordingly, the compositions of the invention herein employ, as one essential ingredient, diethyleneglycol monobutyl ether (DEGMBE), a generally well-known and widely used item of commerce. Broadly, DEGMBE is a completely water-soluble compound (at 20°C), widely used, e.g., as a solvent and a coupling agent, represented by the formula:

(1)   $CH_2OHCH_2OCH_2CH_2OC_4H_9$.

commercial tradenames under which DEGMBE is publicly available include Butyl "Carbitol" (Union Carbide Corp.) and Butyl "Dowanol" (Dow Chemical Co.).

Generally, methods by which DEGMBE can be prepared are well known in the art. One method of its preparation comprises reacting diethyleneglycol with butyl sulfate in the presence of a base (e.g., sodium hydroxide). The more widely used method of preparation comprises reacting ethylene oxide with a molar excess of butyl alcohol under appropriate conditions of pressure and temperature and usually in the presence of a catalyst; the reaction products are a mixture of ethylene glycol monobutyl ether, DEGMBE and other, higher polyglycol butyl ethers, from which DEGMBE can be stripped and refined by procedures known in the art. Of note is the fact that the ethylene glycol monobutyl ether can similarly be stripped from the reaction product mixture, refined, and employed as the EGHE component of the compositions herein. The ethylene oxide and butyl alcohol employed as reactants in the above-described preparation process are similarly readily available items of commerce or can be easily prepared by processes long known in the art.

Other methods which can be employed to prepare DEGMBE can also be used and are disclosed, e.g., in Kirk-Othmer, "Glycols", *Encyclopedia of Chemical Technology, Second Edition*, Vol. 10, pp. 638–648 (1966).

As a second essential component, the compositions herein comprise an ethyleneglycol hydrocarbyl ether or an ester derivative thereof (EGHE) generally represented by the formula:

(a)   $ROCH_2CH_2OR'$, wherein R represents the hydrocarbyl moiety (as the term is used herein) which is selected from the group consisting of substituted and unsubstituted monoalkyls and dialkyls wherein each alkyl has from one to about four carbon atoms, and substituted and unsubstituted monoaryls (i.e., phenyl) and diaryls (i.e., napthyl), and wherein R' is hydrogen or an acyl radical containing from about two to four carbon atoms. Substituents which can be attached to monoalkyl, dialkyl (one or both), phenyl, or naphthyl moieties are generally those which exhibit electron-withdrawing activity and are particularly illustrated by halogens, especially bromine and chlorine.

Preferably, the hydrocarbyl or R in formula (2) is an unsubstituted monoalkyl having from one to about 4 carbon atoms and R' is hydrogen, e.g.,:
ethyleneglycol monomethyl ether,
ethyleneglycol monoethyl ether,
ethyleneglycol monopropyl ether,
ethyleneglycol monoisopropyl ether,
ethyleneglycol monobutyl ether, and
ethyleneglycol monoisobutyl ether, Ethyleneglycol monobutyl ether (hereinafter also referred to herein as EGMBE for brevity) can be advantageously utilized in the compositions herein, inasmuch as it can be prepared simultaneously with DEGMBE as described hereinbefore, and is particularly preferred.

Other EGHE compounds, suitable for use in the invention herein, include, e.g.:
ethyleneglycol dimethyl ether,
ethyleneglycol diethyl ether,
ethyleneglycol dipropyl ether,
ethyleneglycol diisopropyl ether,
ethyleneglycol dibutyl ether,
ethyleneglycol diisobutyl ether,
ethyleneglycol 2-chloro-monobutyl ether,
ethyleneglycol 3-chloro-monobutyl ether,
ethyleneglycol 2-bromo-monobutyl ether,
ethyleneglycol 2-chloro-monopropyl ether,
ethyleneglycol 2,2'-dichloro-diisopropyl ether,
ethyleneglycol 2-chloro-3-bromo-monobutyl ether,
ethyleneglycol 2,3-dibromo-monobutyl ether,
ethyleneglycol 2,3-dichloro-monobutyl ether,
ethyleneglycol 2,2'-dichloro-dibutyl ether,
ethyleneglycol 2,3-dichloro-monobutyl ether,
ethyleneglycol 2-chloro-monoethyl ether,
ethyleneglycol 2-bromo-monoethyl ether,
ethyleneglycol 2,2'-dibromo-dibutyl ether,
ethyleneglycol 3,3'-dibromo-dibutyl ether,
ethyleneglycol 2,3'-dichloro-dibutyl ether,
ethyleneglycol 2-chloro-2'-bromo-dibutyl ether,
ethyleneglycol 2-chloro-3'-bromo-dibutyl ether,
ethyleneglycol phenyl ether,
ethyleneglycol naphthyl ether,
ethyleneglycol 2,3-dichloro-phenyl ether,
ethyleneglycol 4,5-dibromo-phenyl ether,
ethyleneglycol 2,4-dichloro-phenyl ether,
ethyleneglycol 2,5-dichloro-phenyl ether,
ethyleneglycol 3,4-dichloro-phenyl ether,
ethyleneglycol 4,5-dichloro-phenyl ether,
ethyleneglycol 2,3-dibromo-phenyl ether,
ethyleneglycol 2,4-dibromo-phenyl ether,
ethyleneglycol 2,5-dibromo-phenyl ether,
ethyleneglycol 3,4-dibromo-phenyl ether,
ethyleneglycol 2-chloro-3-bromo-phenyl ether,
ethyleneglycol 2-chloro-4-bromo-phenyl ether,
ethyleneglycol 3-bromo-4-chloro-phenyl ether,
ethyleneglycol 2-bromo-4-chloro-phenyl ether,
ethyleneglycol 3-chloro-4-bromo-phenyl ether,
ethyleneglycol 2-chloro-3-bromo-phenyl ether,
ethyleneglycol 2-bromo-3-chloro-phenyl ether,
ethyleneglycol 3-bromo-4-chloro-phenyl ether,
ethyleneglycol 2-bromo-5-chloro-phenyl ether,
ethyleneglycol 2-chloro-5-bromo-phenyl ether,
ethyleneglycol 3-bromo-5-chloro-phenyl ether,
ethyleneglycol 4-chloro-5-bromo-phenyl ether,
ethyleneglycol 4-bromo-5-chloro-phenyl ether,
ethyleneglycol 3-chloro-5-bromo-phenyl ether,
ethyleneglycol 2-chloro-5-bromo-phenyl ether,
ethyleneglycol 2,2'-dichloro-napthyl ether,
ethyleneglycol 2-chloro-napthyl ether,
ethyleneglycol 3-chloro-napthyl ether,
ethyleneglycol 2,3-dichloro-napthyl ether,
ethyleneglycol 2,3'-dichloro-napthyl ether,
ethyleneglycol 2-bromo-napthyl ether,
ethyleneglycol 3-bromo-napthyl ether,
ethyleneglycol 3'-bromo-napthyl ether,
ethyleneglycol 2,4'-dichloro-napthyl ether, ethyleneglycol 2,4'-dibromo-napthyl ether,
ethyleneglycol 2-chloro-3-bromo-napthyl ether,
ethyleneglycol 4-chloro-5'-bromo-napthyl ether,
ethyleneglycol 2-bromo-4-chloro-napthyl ether,
ethyleneglycol 3-chloro-5'-bromo-napthyl ether,
ethyleneglycol 2,2'-dichloro-4-bromo-napthyl ether,
ethyleneglycol 2,3-dibromo-4-chloro-napthyl ether,
ethyleneglycol 4,5-dichloro-5'bromo-napthyl ether,
ethyleneglycol 2-chloro-3',4'dibromo-napthyl ether,
ethyleneglycol 4-chloro-2',3'dibromo-napthyl ether,
ethyleneglycol 2,3-dichloro-4',5'dibromo napthyl ether,
ethyleneglycol 2,3,4-trichloro-5'bromo napthyl ether,
ethyleneglycol 2-bromo-2',3-dibromo napthyl ether, and
ethyleneglycol 4,4',5,5'-tetrachloro-napthyl ether.

Although the EGHE compounds described hereinbefore are preferred, ester derivatives of EGHE can also be employed; such derivatives include, e.g., ester radicals containing from about two to about four carbon atoms, e.g., the acetate, propionate, and butanoate derivatives of EGHE. Examples of such ester derivatives include, e.g.:
ethyleneglycol monomethyl ether acetate,
ethyleneglycol monoisopropyl ether butanoate,
ethyleneglycol monobutyl ether acetate,
ethyleneglycol monobutyl ether butanoate,
ethyleneglycol monobutyl ether propionate,
ethyleneglycol monoisobutyl ether acetate,
ethyleneglycol monoisopropyl ether propionate,
ethyleneglycol monopropyl ether acetate,
ethyleneglycol monoethyl ether acetate,
ethyleneglycol monoethyl ether propionate,
ethyleneglycol monoethyl ether butanoate,
ethyleneglycol monopropyl ether butanoate,
ethyleneglycol monoisopropyl ether acetate,
ethyleneglycol monopropyl ether propionate,
ethyleneglycol monoisobutyl ether butanoate,
ethyleneglycol monoisobutyl ether propionate,
ethyleneglycol monomethyl ether butanoate,
ethyleneglycol monomethyl ether propionate,
ethyleneglycol phenyl ether acetate,
ethyleneglycol phenyl ether butanoate,
ethyleneglycol naphthyl ether acetate,
ethyleneglycol naphthyl ether propionate,
ethyleneglycol naphthyl ether butanoate,
ethyleneglycol 2-chloro-monobutyl ether acetate,
ethyleneglycol 3-chloro-monobutyl ether acetate,
ethyleneglycol 2,3-dichloro-monobutyl ether acetate,
ethyleneglycol 3-bromo-monobutyl ether butanoate,
ethyleneglycol 2-chloro-monopropyl ether acetate,
ethyleneglycol 2-chloro-monopropyl ether propionate,
ethyleneglycol 2-chloro-phenyl ether acetate,
ethyleneglycol 2,4-dibromo-phenyl ether butanoate,
ethyleneglycol 3,3'-dibromo-napthyl ether acetate,
ethyleneglycol 3,4-dibromo-2-chloro-napthyl ether acetate,
ethyleneglycol 2-chloro-3-bromo-naphthyl ether acetate,
ethyleneglycol 2-bromo-4',5'-dibromo-naphthyl ether butanoate,
ethyleneglycol 2-bromo-4,5-dibromo-phenyl ether propionate,
ethyleneglycol 2-chloro-3,4-dibromo-phenyl ether propionate,
ethyleneglycol 3-bromo-4-chloro-phenyl ether propionate,
ethyleneglycol 3-chloro-3',4',5'-tribromo-napthyl ether acetate.

In general, the EGHE compounds are well known and widely used items of commerce. Commercial tradenames under which certain of the EGHE compounds, e.g., EGMBE, are publicly available include the "Cellosolve" products of Union Carbide Corp.

Generally, methods of preparing the EGHE compounds are well known in the art and are similar to those used to prepare DEGMBE. For example, one widely used method comprises reacting ethyleneglycol with excess, e.g., butyl alcohol, whereby EGMBE is produced; see Kirk-Othmer, supra. Other methods can also be used.

The third essential component of the compositions herein is a surfactant, selected from the group consisting of anionic surfactants, cationic surfactants and nonionic surfactants selected from the group consisting of primary, secondary, and tertiary alkyl amines having a total of from about eight to about 22 carbon atoms, wherein each alkyl has from about one to about 22 carbon atoms. Such compounds and methods of their preparation are generally well known in the art.

Examples of anionic ethoxylated alcohol sulfates, suitable for use herein, include water-soluble salts of the sulfated condensation product of from 1 to about 20 moles of ethylene oxide with 1 mole of an alcohol having from about eight to about 18 carbon atoms; such compounds have the generic formula:

(3)  $R_2-O(C_2H_4O)_xSO_3^-M^+$, 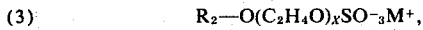

wherein X is an integer of from 1 to about 20, $R_2$ is an alkyl containing from about eight to about 18 carbon atoms, and M is a cation, e.g., an alkali metal (e.g., sodium, potassium, or lithium), ammonium, or substituted ammonium (e.g., monoethanolammonium, diethanolammonium, or triethanolammonium).

Preferred ethoxylated alcohol sulfates are the alkali metal or substituted ammonium salts of the sulfated condensation product of from 1 to about 20 moles of ethylene oxide with 1 mole of octanol, nonanol, decanol, and dodecanol; i.e., the compounds of formula (3) above wherein $R_2$ is an alkyl having eight, nine, 10, and 12 carbon atoms, respectively.

Examples of alkyl sulfates, suitable for use herein, include the water-soluble salts of sulfated alkyls having from about eight to about 18 carbon atoms and generally represented by the formula:

$R_3-OSO_3^-M^+$, 

wherein R is an alkyl having from about eight to about 18 carbon atoms and M is a cation, e.g., an alkali metal (e.g., sodium, potassium, or lithium), ammonium, or substituted ammonium (e.g., monoethanolammonium, diethanolammonium, or triethanolammonium).

Preferred alkyl sulfates of those wherein the alkyl is octyl, nonyl, decyl, and dodecyl, i.e., wherein $R_3$ is an alkyl containing eight, nine, 10, and 12 carbon atoms, respectively.

Examples of anionic sulfonates, suitable for use herein, are the water-soluble salts of a sulfonated alkyl, alkylbenzene, or alkylglycerol ether, wherein the alkyl contains from about eight to about 18 carbon atoms, and can be represented by the generic formula:

(5) $\qquad R_4-(A)_x-SO_3^-M^+$, wherein $R_4$ is an alkyl having from about eight to about 18 carbon atoms; wherein A is a substituted or, preferably, unsubstituted benzene (phenyl) or naphthalene (napthyl) radical, a glycerol-ether radical, a diglycerolether radical, or an acetoxy radical of the formula $$\left[ -O-\overset{\overset{O}{\|}}{C}-CH_2- \right]$$

wherein X is an integer of 0 or 1; and, wherein M is a cation, e.g., an alkali metal (e.g., sodium, potassium, or lithium), ammonium, or substituted ammonium (e.g., monoethanolammonium, diethanolammonium, or triethanolammonium).

Preferred anionic sulfonates are the alkali metal, preferably sodium, salts of a sulfonated alkylbenzene, wherein wherein the alkyl is octyl, nonyl, decyl, and particularly, dodecyl, i.e., wherein, in formula (5), $R_4$ is an alkyl containing eight, nine, 10, and particularly, 12 carbon atoms, and A is a benzene radical.

Particularly preferred surfactants herein are the anionic water-soluble salts (particularly, the alkali metal salts) of an alkylbenzene sulfonic acid, wherein the alkyl is a mixture of alkyls having an average chain length of from about eight to about 18, particularly about 12, carbon atoms; such mixed alkyls are often termed "broad cut", and are included within the meaning of the term "alkyl" as used herein and in the appended claims. To illustrate, a particularly preferred surfactant herein is broad cut sodium $C_{12}$ or dodecyl benzene sulfonate, which is an anionic surfactant wherein the dodecyl alkyl is a mixture of alkyls having an average chain length of about 12 (specifically, between 11 and 12 or about 11.8 carbon atoms) and generally contains (percent is by weight):

$C_9$: from 0 to about 0.4 percent
$C_{10}$: from about 17.7 to about 19.99 percent
$C_{11}$: from about 40.6 to about 42.8 percent
$C_{12}$: from about 29.4 to about 32.7 percent
$C_{13}$: from about 6.6 to about 9.1 percent
$C_{14}$: from about 0.2 to about 0.23 percent.

Similarly, the alkyls in broad cut $C_8$ (octyl) and $C_{18}$ (octadecyl) benzene sulfonate are each a mixture of alkyls having an average chain length of about eight and about 18 carbon atoms, respectively.

With respect to such broad cut alkyls, best results, it is believed, are achieved when the broad cut alkyls comprise at least four different carbon chain lengths, each of which contains from about six to about 20 carbon atoms, wherein at least about 80 percent by weight of the chain lengths are within the range of from about eight to about 18 carbon atoms, and wherein at least two of the chain lengths comprise at least about 20 percent by weight of the alkyl.

Methods which can be utilized to prepare the broad cut alkyl benzene sulfonate detergents employed herein are generally known in the art. For example, a suitable method comprises, firstly, reacting a linear, paraffinic hydrocarbon (e.g., a petroleum distillate) containing a mixture of alkyls having a desired average carbon chain length within the range of from about 8 to about 18, with chlorine under conventional procedures to obtain the chlorinated broad cut, linear hydrocarbon which is thereafter reacted with benzene (e.g., under Friedel-crafts reaction conditions) to obtain the broad cut, linear alkyl benzene, which then can be sulfonated, and thereafter neutralized with an alkali metal hydroxide to provide the broad cut, alkali metal alkylbenzene sulfonate.

The above and other anionic surfactants, suitable for use in the compositions herein, are more particularly described in Francis Diehl, U.S. Pat. No. 3,213,030, issued Oct. 19, 1965, the disclosure of which is incorporated hereinto; other suitable anionic surfactants suitable for use herein are disclosed in U.S. Pats. Nos. 2,220,099; 2,477,383; 2,486,921; 2,486,922; 2,941,948; and, 3,121,249.

Cationic surfactants, which are suitable for use in the compositions of the invention herein, are generally well known in the art and include, e.g., quaternary ammonium salts, quaternary imidazolinium salts, alkyl pyridinium salts, dialkyl morpholinium salts, and quaternary derivatives of amino acids and amino esters.

Preferred cationic surfactants are the quaternary ammonium compounds which include those characterized in the general formula:

(6) $$\left[ \begin{array}{c} R_7 \\ | \\ R_6-N-R_8 \\ | \\ R_5 \end{array} \right]^+ X^-$$

wherein X is an anion, preferably a halide and more particularly, a chloride ion; suitable other anions can include acetate, phosphate, nitrite, and methyl sulfate radicals. Additionally, in formula (6), $R_5$ and $R_6$ represent benzyl or an alkyl containing from one to three carbon atoms, $R_7$ represents benzyl or an alkyl containing from 1 to 3 carbon atoms, or an alkyl of from about eight to about 20 carbon atoms, or alkoxy propyl or hydroxy-substituted alkoxy propyl radicals wherein the alkoxy contains from about eight to about 20 carbon atoms, and $R_8$ represents an alkyl containing from about eight to about 20 carbon atoms. The carbon chains of $R_8$ and $R_7$, whenever $R_7$ represents a chain from about eight to about 20 carbon atoms, can be straight or branched, and saturated or unsaturated. Particularly preferred cationic quaternary ammonium compounds are dialkyldimethyl ammonium chloride or alkyltrimethyl ammonium chloride wherein the alkyl contains from about eight to about 20 carbon atoms and are derived from long chain fatty acids, especially from hydrogenated tallow. The terms "tallow" and "tallow alkyl", used herein, are intended to mean alkyls containing from 16 to 18 carbon atoms.

Other preferred cationic surfactants include quaternary imidazolinium compounds which conform to the formula:

(7) 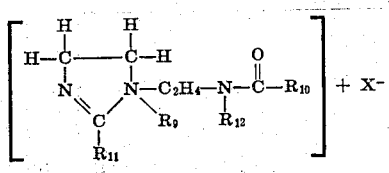

wherein $R_9$ is an alkyl containing from one to about four, preferably from one to about two, carbon atoms, $R_{10}$ is an alkyl containing from one to about four carbon atoms or a hydrogen radical, $R_{11}$ is an alkyl containing from about eight to about 20, preferably at least 12, carbon atoms, $R_{12}$ is a hydrogen or an alkyl containing from about eight to about 20, preferably at least 12, carbon atoms, and X is an anion, preferably a methyl sulfate or a chloride anion. Other suitable anions include those disclosed with reference to the cationic quaternary ammonium surfactants of formula (6). Particularly preferred are those imidazolinium compounds of formula (7) in which both $R_{12}$ and $R_{11}$ are alkyls of from about 12 to 20, especially about 12 carbon atoms.

Other cationic quaternary ammonium surfactants, suitable for use herein, include, e.g., alkyl pyridinium chlorides, wherein the alkyl contains from about eight to about 18 carbon atoms, dialkyl morpholinium chlorides, wherein one alkyl contains from one to about three carbon atoms and the other alkyl contains from about eight to about 18 carbon atoms, and quaternary derivatives of amino acids and amino esters; see, e.g., U.S. Pats. Nos. 3,223,718; 3,329,609; and, 3,095,373.

Other surfactants for use in the invention herein include nonionic surfactants selected from the group consisting of primary, secondary, and tertiary amines having a total of from about eight to about 22 carbon atoms, wherein each alkyl can contain from about one to about 22 carbon atoms, and conforming to the generic formula:

wherein $R_{13}$ and $R_{14}$ are each selected from the group consisting of hydrogen or an alkyl containing from about one to about 22 carbon atoms, and $R_{15}$ is an alkyl containing from about one to about 22 carbon atoms; when both $R_{13}$ and $R_{14}$ are alkyls, the alkyls can be the same or different, and one or both of the alkyls can be the same as or different from $R_{15}$.

Preferred amines are the primary amines having from about eight to about 22, particularly from about eight to about 12, carbon atoms, i.e., amines of formula (8) wherein $R_{13}$ and $R_{14}$ are both hydrogen and $R_{15}$ is an alkyl containing from about eight to about 22, particularly from about eight to about 12, carbon atoms. Examples of particularly preferred nonionic primary amines include, e.g., octylamine, nonylamine, decylamine, undecylamine and dodecylamine.

Contrary to expectations, it has also been surprisingly found that the surfactant must generally be limited to the foregoing anionic, cationic, or nonionic amine descriptions. When other nonionic surfactants, notably nonionic polyethoxylated alcohols or alkyl phenols, are substituted for a surfactant employed in a composition of the present invention, the resulting composition generally fails to exhibit any significant or appreciable effect as a retardant or inhibitor of tobacco suckers. Moreover, the use of other non-ethoxylated nonionic surfactants, such as the fatty acid esters of glucose or glucose derivatives (e.g., sorbitan monolaureate or oleate), in lieu of the specific surfactants employed herein, similarly results in compositions unsatisfactory as tobacco sucker control compositions.

It has further been surprisingly discovered that the enhanced growth-regulating characteristics of the compositions herein are observed only when the compositions comprise DEGMBE, EGHE, and the specifically selected surfactant in a specific weight ratio relationship of about 2:1:1, respectively. Apparently, varying this weight relationship generally results in compositions which are of little or no effect as growth-regulators or which are undesirably destructive, either in whole or in part, to the plant. For example, compositions, comprising components of the compositions of the instant invention in DEGMBE: EGHE: surfactant weight ratios of 1:2:1, 1:1:1, 1:1:2, and 1:2:2, were formulated, control-tested, and found to be generally unsatisfactory as tobacco sucker control agents; Example III illustrates the criticality of the weight ratio relationship employed herein in more detail.

Moreover, it has been surprisingly found that in the aqueous compositions of the invention herein, the concentration of the (A) DEGMBE, (B) EGHE, and (C) surfactant components in combination is also critical to the achievement of satisfactory growth-regulating compositions. Accordingly, the aqueous compositions herein comprise a concentration of the sum of components (A), (B), and (C) herein to the water within a range of from about 1:4.5 to about 1:12, preferably about 1:9, by volume, i.e., a concentration made from one part concentrate (of (A), (B), and (C)) diluted with from about 4.5 to about 12 parts, preferably about 9 parts, by volume of water. Concentrations higher than about 1:4.5 (e.g., 1:3), although generally effective in inhibiting sucker growth, generally cause damage or even destruction to the tobacco leaves and/or the plants; compositions having concentrations lower than about 1:12 (e.g., 1:18) generally have little or no effect on tobacco sucker growth. Maximum activity of the compositions is apparently obtained by using the preferred concentration of about 1:9, concentrate to water (by volume).

Accordingly, the invention herein contemplates the use of aqueous compositions, generally effective as growth-regulators, comprising (A) DEGMBE, (B) EGHE, (C) a specifically selected surfactant as disclosed hereinbefore, and (D) water, wherein the weight ratio of (A) to (B) to (C) is respectively about 2:1:1, and wherein the volumetric ratio of the sum of (A), (B), and (C) to (D) is within the range of from about 1:4.5 to about 1:12.

A particularly preferred composition herein comprises (A) about 5 percent by weight DEGMBE, (B)

about 2.5 percent by weight EGMBE, (C) about 2.5 percent by weight of an anionic surfactant which is broad cut sodium dodecylbenzene sulfonate, wherein the dodecyl alkyl is a mixture of alkyls having an average chain length of between 11 and 12, specifically about 11.8, carbon atoms, and (D) water; wherein the volumetric ratio of the sum of (A), (B), and (C) to (D) is about 1:9. This particular composition is in the form of an aqueous solution and has demonstrated satisfactory sucker control effectiveness on a number of different tobacco species, e.g., flue-cured and Burley; additionally, this composition has exhibited satisfactory selective retardation or inhibition of the growth of meristematic tissue of woody ornamentals, such as azaleas.

The invention herein further contemplates a concentrated composition comprising (A) DEGMBE, (B) EGHE, and (C) a specifically selected surfactant, as disclosed hereinbefore, wherein the weight ratio of (A) to (B) to (C) is 2:1:1, e.g., a concentrate comprising about 50 percent by weight DEGMBE, about 25 percent by weight EHGE, and about 25 percent by weight of an anionic, cationic, or nonionic amine surfactant in accordance with the foregoing disclosure. This concentrate can readily be mixed with water to provide the dilute, aqueous compositions of the invention herein which have a concentrate (i.e., sum of components (A), (B), and (C)) to water volumetric ratio of from about (respectively) 1:4.5 to about 1:12, preferably about 1:9, and which generally achieve enhanced growth-regulation of tobacco suckers and woody ornamentals, such as azaleas.

The concentrate compositions herein are particularly useful, inasmuch as packaging and transportation are facilitated and can be done more economically than packaging and transporting the aqueous compositions herein. Additionally, the prepackaged concentrate requires less storage area than the aqueous compositions and can conveniently be mixed with water to the proper concentrations immediately prior to use.

Other suitable materials, such as insecticides, fungicides, foliage fertilizers, perfumes and coloring agents, can additionally be incorporated into the compositions (either dilute or concentrate) of the invention herein in order to achieve two or more objectives in one treatment application. Similarly, other known growth-regulating agents can, if desired, be incorporated into the compositions herein, for example, n-alkanols having from eight to 10 carbon atoms, or fatty acid methyl esters having a total of from about eight to about 18 carbon atoms.

Although not part of the instant invention, it will be appreciated that, while the compositions herein comprise essential components which are limited to a specific weight ratio relationship and to specific volumetric ratios as disclosed hereinbefore, compositions employing the same components in a different weight ratio relationship may, upon experimental trial and error, prove satisfactory growth-regulators under specific circumstances or conditions; thus, e.g., an aqueous composition employing the (A) DEGMBE, (B) EGHE, and (C) surfactant components herein in a respective weight ratio of 1:1:1, 1:2:2, 1:2:1, or the like, may prove effective when employed at a specific concentrate to water volumetric ratio higher than those volumetric ratios employed herein, e.g., at a volumetric ratio of 1:3, concentrate to water.

The concentrated compositions herein are particularly useful, in dilute form, in controlling the growth of undesirable tobacco suckers. Accordingly, the invention herein additionally comprises a process for inhibiting or retarding the growth of tobacco suckers comprising the step of applying an effective amount of a dilute, aqueous composition (derived from the concentrated compositions of the invention herein) to the tobacco plants; application to the plants can generally be accomplished by conventional methods, e.g., spraying, painting, or the like. The aqueous compositions can be applied to either topped or untopped tobacco plants; accordingly, the process herein can additionally comprise the step of, prior to applying a composition herein to the tobacco plants, topping the tobacco plants and, desirably, removing the larger suckers by hand.

Usually one application of the dilute composition is sufficient to adequately inhibit or retard the tobacco suckers. In some cases, however, a second application is beneficial; the second application should follow the first one by about ten days. While the composition can be applied by a number of different methods, spraying method. been found to be a most advantageous and preferred method Generally, any range of pressures can be used to spray an effective amount of the compositions on the plant without damaging or destroying the tobacco leaf or its commercial value. Although not essential, a range of pressures generally varying from about 10 pounds per square inch to about 40 pounds per square inch is utilized in the spraying operation, depending, of course, on the diameter of the nozzle openings and the distance of the nozzle from the plant. The preferred spraying pressures are from about 15 pounds per square inch to about 25 pounds per square inch. When the spraying operation is carried out within the specified ranges for spraying pressures, the tobacco sucker control composition is generally forced from the container at a high enough rate to minimize drift and provide for an economical spraying operation, and the plant is generally not damaged by the force of the spray and is generally provided with an effective amount of the composition.

Inasmuch as the compositions herein are also systemically active, their application (in dilute form) to tobacco plants is greatly facilitated. In the case of contact compositions, care must be taken to insure that the plant stalk, from which suckers grow, is sufficiently treated or covered with the composition in order to provide satisfactory results; the dilute compositions herein are free from this restraint and, indeed, generally perform satisfactorily even when applied as a foliar spray, i.e., applied primarily onto the tobacco leaves.

In general, the tobacco sucker control compositions herein are applied in dilute form to the tobacco plants in an effective amount, i.e., an amount sufficient to achieve satisfactory retardation or inhibition of sucker growth. It has generally been found that the application of from about one-half ounce to about 3 ounces, preferably about 2 ounces, of an aqueous composition herein to the plant generally provides an effective amount; similarly, an effective amount of an aqueous composition herein is generally provided, without the necessity of metering out a specific number of ounces, by spraying the plants to 'run-off', i.e., until the composition drips from the tobacco leaves.

Although optional and not essential to the invention herein, the concentrate compositions of this invention (as well as their dilute derivatives) can additionally comprise trisodium phosphate (TSP). The addition of trisodium phosphate generally has no bearing upon the systemic activity of the compositions herein or upon their efficacy; however, it is believed, the trisodium phosphate may contribute to forming a foam of a dilute, aqueous composition herein during the spraying operation. This foam is a slow-breaking foam, usually lasting from fifteen seconds to about 1 minute and has as its advantage the capacity to keep the aqueous compositions of the invention herein in contact with the plants for longer periods of time.

When desired for use, the trisodium phosphate can generally be used in an amount equivalent to the amount of surfactant, i.e., in a trisodium phosphate to surfactant weight ratio of about 1:1. For example, a particularly preferred concentrate composition of the invention herein, which additionally comprises TSP, comprises (percent by weight): (A) about 40 percent DEGMBE, (B) about 20 percent EGMBE, (C) about 20 percent sodium broad cut alkylbenzene sulfonate wherein the alkyl is a mixture of alkyls having an average chain length of between 11 and 12 (specifically about 11.8) carbon atoms, and (E) about 20 percent TSP. When components (A), (B), (C) and (E) of the concentrate are diluted with water to a volumetric ratio of about 1:9 (concentrate to water), the resulting dilute, aqueous composition comprises about 4 percent by weight DEGMBE, about 2 percent by weight EGMBE, about 2 percent by weight of the surfactant, and about 2 percent by weight TSP, the balance being water, and, when sprayed to run-off on flue-cured and Burley tobacco, exhibits characteristics of a slow-breaking foam and is effective in the inhibition or retardation of tobacco sucker growth; generally, the mature tobacco leaves are left unaffected by the treatment.

Tobacco plants (and leaves) treated with the dilute, aqueous compositions herein are generally of the same quality as hand-suckered tobacco (which is generally used throughout the industry as the standard of quality); thus, treatment of tobacco plants in accordance with the process of the invention herein is generally accompanied by little, if any, damage or injury to the plants or their leaves, and the grade and yield of the treated tobacco plants is generally as good as or better than that of hand-suckered tobacco.

Desirably, tobacco plants treated in accordance with the invention herein generally exhibit a filling value similar to that of hand-suckered tobacco. The term "-filling value", as used herein, is well-defined in the art and generally refers to the volume of tobacco (in the leaves) per a given weight; the higher the filling value, the more cigarettes or other tobacco products can be produced from a given weight of tobacco. Contrary to results obtained by the treatment process herein, similar treatment of tobacco plants with other systemic growth regulators, e.g., maleic hydrazide or derivatives thereof, reduce substantially the filling value, relative to hand-suckered tobacco.

Moreover, treatment of tobacco plants with the dilute, aqueous compositions herein, unlike other systemics, e.g., maleic hydrazide and derivatives thereof, generally does not adversely affect the reducing sugars to total alkaloids ratio of the tobacco, relative to that of hand-suckered tobacco. Generally, the amount of reducing sugars present in the tobacco is inversely proportional to the amount of nicotine and other alkaloids therein; thus, a reduction in the amount of reducing sugars present in the tobacco generally causes an undesirable increase in the amounts of nicotine and other alkaloids.

The following specific examples are given in order to further clarify and strengthen this invention and are not intended to limit the scope in any way.

EXAMPLE I

Tobacco plants (*Xanthi x N.C. 95*) which were 13 and 15 weeks old were sprayed to run-off with the following aqueous solutions, wherein percentages are by weight: (A) about 4 percent diethyleneglycol monobutylether; (B) about 2 percent ethyleneglycol monobutylether; (C) about 2 percent broad cut sodium dodecyl alkyl-benzenesulfonate having an average alkyl chain length of between 11 and 12 (specifically about 11.8) carbon atoms; (D) about 4 percent diethyleneglycol monobutylether and about 2 percent ethyleneglycol monobutylether; (E) about 4 percent diethyleneglycol monobutylether and about 2 percent of the sodium alkylbenzenesulfonate of Composition (C); (F) about 2 percent ethyleneglycol monobutylether and about 2 percent of the sodium alkylbenzenesulfonate of Composition (C); and, (G) about 4 percent diethyleneglycol monobutylether, about 2 percent ethyleneglycol monobutylether, and about 2 percent of the sodium alkylbenzenesulfonate of Composition (C). monobutylether; (E) about 4 percent diethyleneglycol monobutylether and about 2 percent of the sodium alkylbenzenesuflonate of Composition (C); (F) about 2 percent ethyleneglycol monobutylether and about 2 percent of the sodium alkylbenzenesulfonate of Composition (C); and, (G) about 4 percent diethyleneglycol monobutylether, about 2 percent ethyleneglycol monobutylether, and about 2 percent of the sodium alkylbenzenesulfonate of Composition (C).

In addition to the above formulations, a composition (H) containing the ingredients of Composition (G), and in addition, 2 percent trisodium orthophosphate was painted on leaves of similar tobacco plants.

All compositions comprised sufficient water to provide a volumetric ratio of about 1:9, component(s) to water. Composition (G) is derived by diluting a concentrate composition comprising about 50 percent DEGMBE, about 25 percent EGMBE, and about 25% broad cut sodium $C_{11.8}$— alkylbenzenesulfonate, with the necessary amount of water to provide the 1:9 volumetric ratio employed herein.

Results were as follows:

Composition (A): Four days later, there was sucker kill and incomplete apical meristem kill. There was some distortion of young leaves. Eighteen days later, the top had grown through and the buds were set. There were some sucker buds still present.

Composition (B): Five days later, there was no apparent effect. Eighteen days later, the top had grown through, the buds were set, and sucker buds were still present.

Composition (C): Five days later, there was no apparent effect. Eighteen days later, the top had grown through, some sucker buds were present, but some scarring at leaf axil was evident.

Composition (D): Five days later, there was sucker kill, some apical meristem kill, and some young leaf distortion. Eighteen days later, the top had grown through on one plant, there were top suckers on other plants, and suckers below the top of the plant at time of the spraying had been stopped on the plant. There was some leaf distortion.

Composition (E): Five days later, there was sucker kill, some apical meristem kill, and burn on mature leaves. Eighteen days later, the top had been stopped. There was some sucker growth from bottom axils which were apparently missed by the original spray.

Composition (F): Five days later, there was no apparent kill, but some whitening around leaf margins. Eighteen days later, the top had grown through on the plants, and sucker buds were still present.

Composition (G): Five days later, there was apical meristem kill, sucker kill, and some top leaf distortion. Eighteen days later, the top was stopped on the plants, but there was a cluster of suckers at the top. Sucker buds were still present on one plant on the bottom. The sucker buds were dead where contacted.

In the last treatment, where composition (H) was painted on tobacco leaves, five days later, there was sucker kill at axils below the painted leaves. There was apical meristem kill on one plant. There was a color change to a lighter green at the painted portion of the leaves. Eighteen days later, growth of the tops had stopped, there were some bottom suckers, and leaves had returned to the original green color.

As can be seen from the preceding example, a mixture of ingredients is required for effective growth control, i.e., one must have the diethyleneglycol monobutylether, the ethyleneglycol monobutylether, and the sodium alkylbenzenesulfonate in order to provide effective inhibition of apical meristematic growth such as the top of tobacco plants and tobacco suckers. It is also apparent that the mechanism by which the compositions of this invention control apical meristematic growth is a combination of a contact action and a systemic action.

EXAMPLE II

Composition (G) of Example I was repeatedly field tested on both flue-cured and Burley tobacco in order to further determine its effectiveness as a sucker control agent, primarily by determining reduction of sucker weight per plant. For each test, the plants were first topped and the compositions were applied by hand spraying an amount of from 1 to 2 ounces per plant; after about 4 weeks, the suckers on the sprayed plants were removed, counted, and weighed and were then compared to the suckers similarly removed from untreated or check plants, counted and weighed. Dividing the weight of suckers from treated plants by the weight of suckers from check plants subtracting the answer from 100 and then multiplying by 100 gave a percentage of control for each test. The percentages of control for flue-cured tobacco ranged from about 60 to about 100 percent (average about 80 percent); the percentages of control for Burley tobacco ranged from about 60 to about 66 percent (average about 63 percent). The recited percentages indicate the significant level of reduction in tobacco sucker growth achieved by the compositions herein relative to the check plants.

EXAMPLE III

Composition (G) of Example I was tested on the tobacco plants and in accordance with the process of Example I. Similarly tested were compositions (I), (J), and (K) comprising the same components as composition (G), but having a weight relationship of 1:2:1, 1:1:2, and 1:2:2 of components DEGMBE, EGMBE, and the sodium coconut-alkylbenzenesulfonate, respectively. Compositions (I), (J), and (K) were each diluted with water to a volumetric ratio of about 1:9, the sum of the components to water.

Checking the height of the plants, as determinative of the selected destruction of meristematic tissue, the following figures were resolved, the figures representing the average increase in plant height (in inches) for treated and untreated plants:

| | |
|---|---|
| Composition (G) | 4.00 |
| Composition (I) | 7.75 |
| Composition (J) | 8.25 |
| Composition (K) | 8.50 |
| Check Plants | 10.00 |

This example demonstrates that only Composition (G) herein, achieved significant reduction or inhibition of the growth of the meristematic tissue of the plants.

EXAMPLE IV

Example III was repeated utilizing Composition (G) OF Example I and a similar composition (L), in which the broad-cut sodium dodecyl alkylbenzenesulfonate of Composition (G) was substituted by ethoxylated sorbitan monolaureate prepared from the condensation reaction of 20 moles of ethylene oxide with one mole of sorbitan monolaureate, and a third composition (M), in which the broad-cut sodium dodecyl alkylbenzenesulfonate was replaced by sorbitan monooleate prepared by the reaction of oleic acid with sorbitan. Compositions (L) and (M) had a similar concentrate to water volumetric ratio of about 1:9.

The results observed from comparison of the three compositions, relative to check plants, were as follows (average height increase in inches):

| | |
|---|---|
| Check Plant | 10.00 |
| Composition (G) | 4.00 |
| Composition (L) | 11.00 |
| Composition (M) | 7.50 |

The results indicate the essentiality of limiting the specific surfactant to those disclosed as suitable herein and further illustrate the enhanced activity achieved by the compositions herein which utilize these specifically selective surfactants.

EXAMPLE V

When Example I is repeated using Composition (G) in which the ethyleneglycol monobutylether therein is substituted with other EGHE compounds (or ester derivatives thereof) as disclosed hereinbefore, particularly with ethyleneglycol monopropylether, ethyleneglycol monoethylether, ethyleneglycol monomethylether, ethyleneglycol monoisopropylether, ethyleneglycol monoisobutylether, ethyleneglycol diethylether, ethyleneglycol dibutylether, ethyleneglycol phenylether, ethyleneglycol napthylether, or ethyleneglycol 2-chloro-phenylether, results similar to those achieved by Composition (G) therein are achieved.

EXAMPLE VI

When Example I is repeated utilizing composition (G) therein substituting for the sodium dodecyl alkylbenzenesulfonate therein, the potassium, lithium, monoethanolammonium, diethanolammonium, triethanolammonium, dimethanolammonium, dipropanolammonium, tripropanolammonium, monobutanolammonium, dibutanolammonium, tributanolammonium, monomethanolammonium, and diisopropanolammonium salts for the sodium salts used therein, similar results are achieved.

EXAMPLE VII

When Example I is repeated utilizing Composition (G) therein and substituting for the sodium dodecyl alkylbenzenesulfonate therein the following surfactants, substantially similar results are achieved: nine, tallow dimethylammonium chloride, decyl trimethylammonium chloride, didodecyl dimethylammonium chloride, dihydrogenated tallow imidazoline, sodium octadecylsulfate, sodium octylsulfate, sodium dodecylsulfate, sodium octylsulfonate, sodium octadecylsulfonate, sodium dodecylsulfonate, dodecylamine, didodecylamine, decylamine, didecylamine, octylamine, dioctylamine, octadecylamine, dioctadecylamine, tridecylamine, tridodecylamine, tritetradecylamine, sodium octylbenzenesulfonate, sodium octadecylbenzenesulfonate, sodium tetradecylbenzenesulfonate, sodium decylbenzenesulfonate, sodium dodecylglycerolether sulfonate, sodium octadecylglycerolether sulfonate, sodium broad cut alkylbenzene sulfonates wherein the alkyl is a mixture of alkyls having an average of about eight, about noine, about 10, about 11, about 13, about 14, about 15, about 16, about 17, and about 18 carbon atoms, the sodium salts of the sulfated reaction products of one mole of dodecanol with 15 moles and with 20 moles of ethylene oxide, the sodium salts of the sulfated reaction products of 1 mole of octanol and 1 mole of octadecanol with each of 10 moles, 15 moles and 20 moles of ethylene oxide, and potassium dodecyldiglycerolether sulfonate.

Having described the invention in detail, what I now claim is:

1. A process for retarding the growth of tobacco suckers, comprising the step of applying to the tobacco plants an amount, sufficient to retard the growth of said suckers, of a growth-regulating composition comprising:
   A. diethyleneglycol monobutylether; (B) an ethyleneglycol hydrocarbyl ether, wherein said hydrocarbyl is selected from the group consisting of (1) substituted and unsubstituted monoalkyls and dialkyls wherein each alkyl contains from about one to about four carbon atoms and wherein the substitutents are selected from the group consisting of chlorine and bromine, and (2) substituted and unsubstituted phenyl and napthyl wherein the substituents are selected from the group consisting of chlorine and bromine; (C) a surfactant selected from the group consisting of anionic surfactants, cationic surfactants, and nonionic surfactants selected from the group consisting of primary, secondary, and tertiary alkyl amines having a total of from about eight to about 22 carbon atoms wherein each alkyl contains from about one to about 22 carbon atoms; and (D) water; wherein the weight ratio of component (A) to component (B), to component (C) is, respectively, about 2:1:1 and wherein the volumetric ratio of the sum of components (A), (B) and (C) to component (D) is within the range of from about 1:4.5 to about 1:12.

2. A process in accordance with claim 1, wherein said ethyleneglycol hydrocarbylether is an unsubstituted ethyleneglycol monoalkylether wherein the alkyl contains from 1 to about 4 carbon atoms.

3. A process in accordance with claim 2, wherein said ethyleneglycol monoalkylether is ethyleneglycol monobutylether.

4. A process in accordance with claim 1 wherein said surfactant is an anionic surfactant.

5. A process in accordance with claim 4, wherein said anionic surfactant is an alkali metal alkylbenzenesulfonate wherein said alkyl contains from about eight to about 18 carbon atoms.

6. A process in accordance with claim 4, wherein said alkali metal alkylbenzenesulfonate is a broad cut sodium alkylbenzenesulfonate wherein said alkyl is a mixture of alkyls having an average chain length of from about eight to about 18 carbon atoms.

7. A process in accordance with claim 1, wherein said volumetric ratio is, respectively, about 1:9.

8. A process in accordance with claim 1, wherein said composition comprises: (A) about 5 percent by weight diethyleneglycol monobutylether; (B) about 2.5 percent by weight ethyleneglycol monobutylether; (C) about 2.5 percent by weight broad cut sodium alkylbenzenesulfonate, wherein said alkyl is a mixture of alkyls having an average chain length of between 11 and 12 carbon atoms; and, (D) water; wherein the volumetric ratio of the sum of components (A), (B), and (C) to component (D) is about 1:9.

9. A process in accordance with claim 1, wherein said composition additionally comprises (E) trisodium phosphate, wherein the weight ratio of component (A) to component (B) to component (C) to component (E) is, respectively, about 2:1:1:1, and wherein the volumetric ratio of the sum of components (A), (B), (C), and (E) to component (D) is within the range of from about 1:4.5 to about 1:12.

10. A process in accordance with claim 9, wherein said composition comprises: (A) about 4 percent by weight diethyleneglycol monobutyl ether; (B) about 2 percent by weight ethyleneglycol monobutyl ether; (C) about 2 percent by weight of an anionic surfactant which is broad cut sodium alkylbenzenesulfonate, wherein the alkyl is a mixture of alkyls having an average chain length of between 11 and 12 carbon atoms; (D) water; and, (E) about 2 percent by weight trisodium phosphate; wherein the volumetric ratio of the sum of components (A), (B), (C), and (E) to component (D) is about 1:9.

* * * * *

PO-1050
(5/69)

UNITED STATES PATENT OFFICE
CERTIFICATE OF CORRECTION

Patent No. 3,713,804         Dated January 30, 1973

Inventor(s) David E. Moccia

It is certified that error appears in the above-identified patent and that said Letters Patent are hereby corrected as shown below:

Col. 1, line 44, delete "growthregulating" and insert therefore --- growth-regulating ---.
Col. 2, line 42, delete "compositions" and insert therefore --- composition ---.
Col. 9, line 29, delete the second occurrence of "wherein".
Col. 10, (in the formula (6)) "+X-" should be --- + $X^-$ ---.
Col. 14, line 26, delete "method." and insert therefore --- has ---.
Col. 16, lines 39 - 47 delete "monobutylether; (E) about 4 percent diethyleneglycol monobutylether and about 2 percent of the sodium alkylbenzenesulfonate of Composition (C); (F) about 2 percent ethyleneglycol monobutylether and about 2 percent of the sodium alkylbenzenesulfonate of Composition (C); and, (G) about 4 percent diethyleneglycol monobutylether, about 2 percent ethyleneglycol monobutylether, and about 2 percent of the sodium alkylbenzenesulfonate of Composition (C)."
Col. 18, line 37, delete "OF" and insert therefore --- of ---.
Col. 19, line 28, delete "nine" and insert therefore --- dihydrogenated ---.

Signed and sealed this 20th day of November 1973.

(SEAL)
Attest:

EDWARD M. FLETCHER, JR.
Attesting Officer

RENE D. TEGTMEYER
Acting Commissioner of Patents